United States Patent [19]

Iwashita

[11] Patent Number: 5,467,001
[45] Date of Patent: Nov. 14, 1995

[54] CONTROL METHOD FOR AN ALTERNATING CURRENT MOTOR

[75] Inventor: Yasusuke Iwashita, Minamitsuru, Japan

[73] Assignee: Fanuc Ltd., Minamitsuru, Japan

[21] Appl. No.: 244,636

[22] PCT Filed: Oct. 4, 1993

[86] PCT No.: PCT/JP93/01420

§ 371 Date: Jun. 6, 1994

§ 102(e) Date: Jun. 6, 1994

[87] PCT Pub. No.: WO94/08389

PCT Pub. Date: Apr. 14, 1994

[30] Foreign Application Priority Data

Oct. 7, 1992 [JP] Japan .................................. 4-291935

[51] Int. Cl.⁶ .................................................... H02K 17/32
[52] U.S. Cl. ........................ 318/434; 318/472; 318/700; 318/798
[58] Field of Search ..................... 318/432, 433, 318/434, 700–701, 716–724, 798–811

[56] References Cited

U.S. PATENT DOCUMENTS

| | | | |
|---|---|---|---|
| 4,270,164 | 5/1981 | Wyman et al. | 318/635 X |
| 4,281,276 | 7/1981 | Cutler et al. | 318/803 |
| 4,375,047 | 2/1983 | Nelson et al. | 318/436 |
| 4,443,750 | 4/1984 | Sheng | 318/888 |
| 4,611,159 | 8/1986 | Kurakake et al. | 318/803 |
| 4,843,297 | 6/1989 | Landino | 318/806 X |

FOREIGN PATENT DOCUMENTS 3-7084   1/1991   Japan .
3-203060 9/1991   Japan .
4-172981 6/1992   Japan .

*Primary Examiner*—David S. Martin
*Attorney, Agent, or Firm*—Staas & Halsey

[57] ABSTRACT

A control method for an alternating current motor, wherein after a torque command Tcmd1 is obtained, if the motor is accelerating, and the obtained torque command Tcmd1 is found to not exceed a predetermined limit value $K_0$, the torque command Tcmd1 is directly outputted as a torque command (a current command) Tcmd2 to each phase current loop circuit which controls the current flowing through each phase winding of the motor. If the torque command Tcmd1 exceeds the limit value $K_0$, an amplitude $I_0$ of the actual current is obtained. A limit value L is obtained based on a magnitude R(T) of the torque command Tcmd2 obtained one period before and the limit value $K_0$. The torque command Tcmd1 is clamped by the limit value L to provide the torque command Tcmd2 to be supplied to the current loop. When the motor is decelerating, the control method compares the torque command Tcmd1 with the predetermined limit value $K_0$ and the torque command Tcmd1 is not directly outputted as the torque command Tcmd2. When the motor is accelerating, the limit value L is obtained based on a ratio of the current command to the amplitude of the actual current, thereby generating the torque command Tcmd1 clamped at this limit value. Thus the output torque can be increased without decreasing the amplitude of the actual current. During deceleration, if the actual current increases due to a reverse electromotive force, the limit L decreases to reduce the command and, therefore, the actual current will not exceed the limit value.

16 Claims, 4 Drawing Sheets

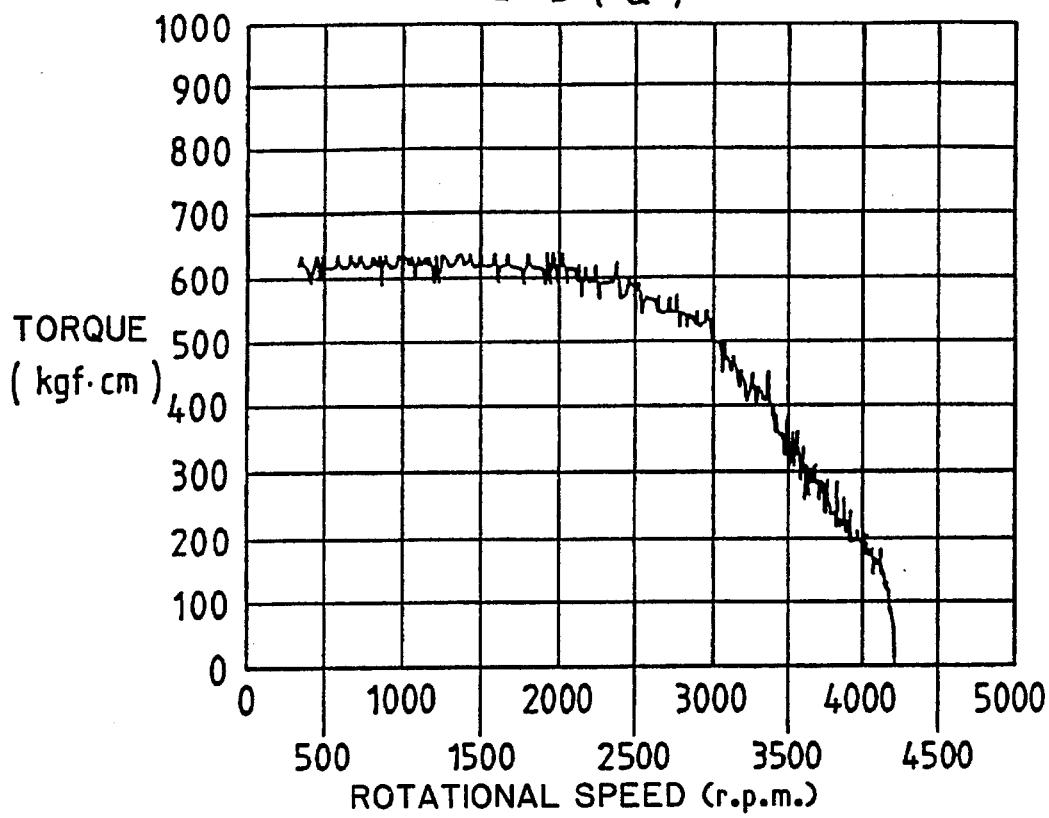
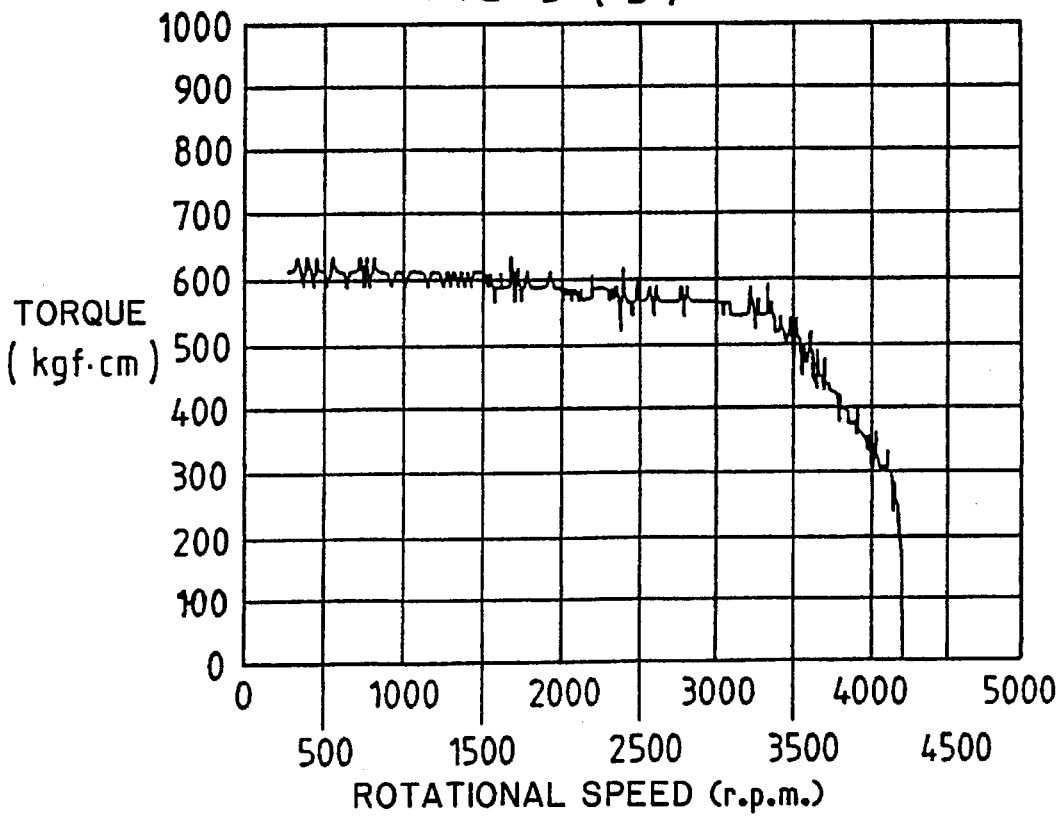

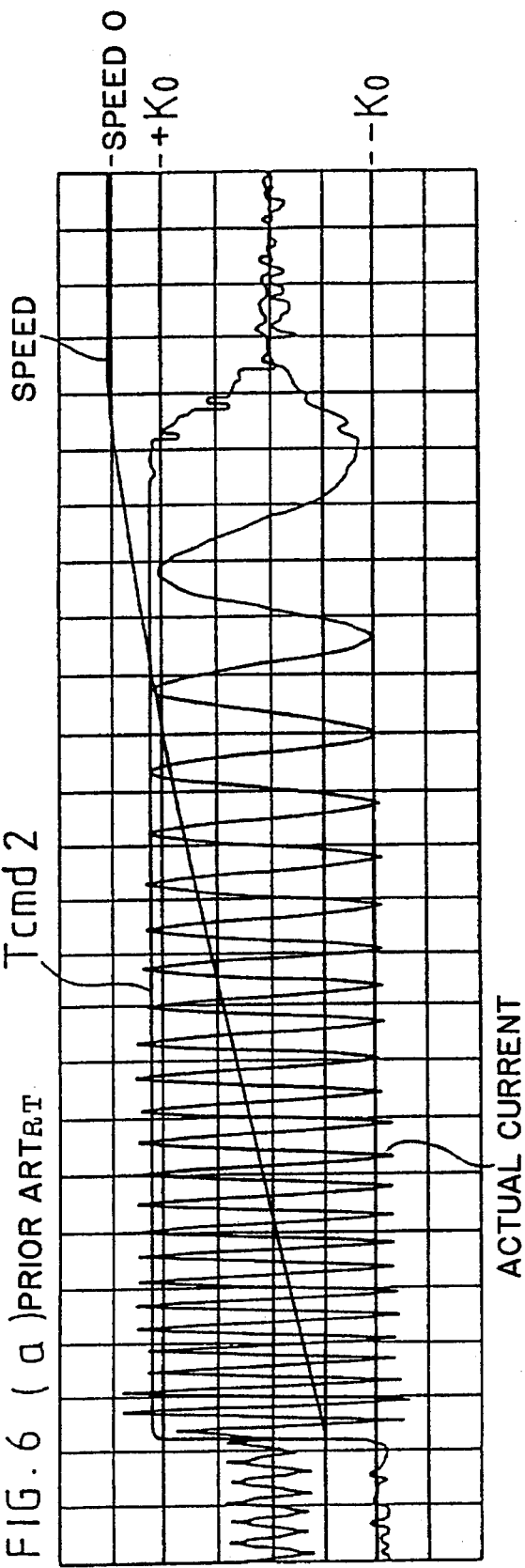
FIG. 6 (a) PRIOR ART
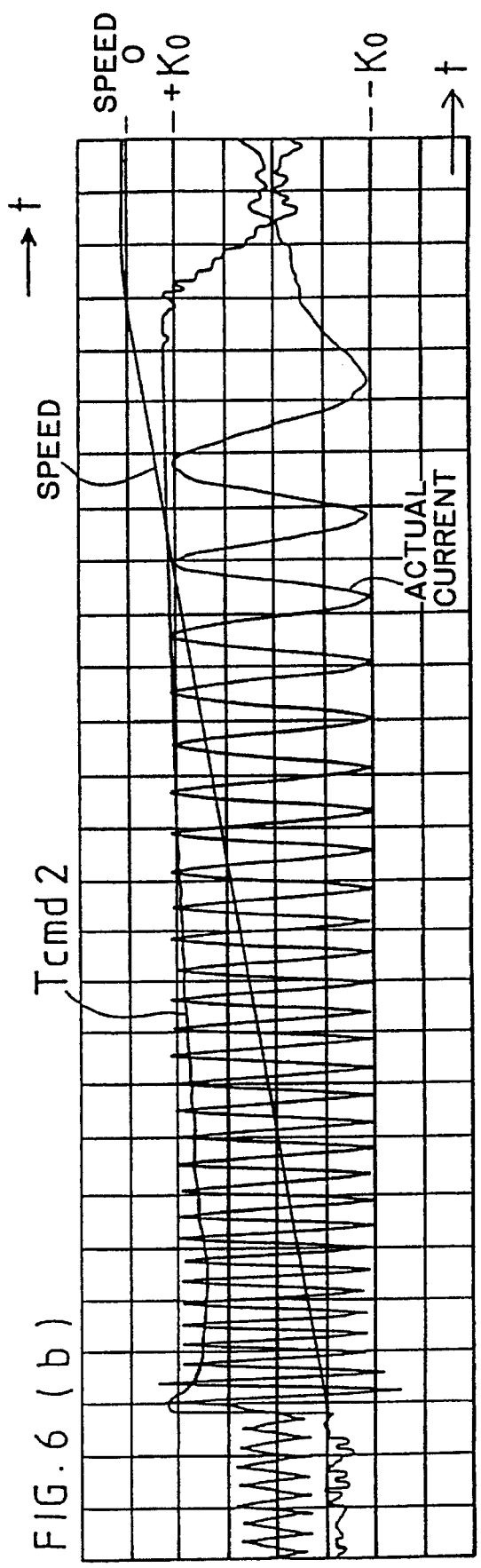
FIG. 6 (b)

CONTROL METHOD FOR AN ALTERNATING CURRENT MOTOR

TECHNICAL FIELD

The present invention relates to a control method for an alternating current motor, and more particularly, to a control method for an alternating current motor with a limiter capable of clamping a torque command at a predetermined limit value when the torque command exceeds the limit value, thereby providing thus a limited torque command, as an amplitude of a current command, to a current loop of each phase of the alternating current motor.

BACKGROUND ART

In alternating current type, motors such as induction motors and synchronous motors, current flowing through each exciting winding is alternating current, whose frequency is proportional to a rotational speed of the motor. Thus, with increasing rotational speed of the motor, frequency of the command current to be supplied to the exciting winding and frequency of the actual current of the exciting winding increase. Frequency increase of the actual current brings amplitude reduction of the actual current with respect to the command, as well as phase delay and power factor reduction.

FIG. 1 is a block diagram showing a conventional speed loop processing used for the speed control of a three-phase AC motor.

In FIG. 1, a reference numeral represents a speed loop compensatory circuit, in which a speed feedback signal of supplied from a speed detector, attached to the motor to detect the actual speed of the motor, is subtracted from a speed command Vc to obtain a speed deviation. The product of the integrated value of the speed deviation and integral constant K1, and the product of the speed deviation and the proportional constant K2 are added, and the result is outputted as torque command Tcmd1. That is, the PI (proportional-and-integral) control is applied to the speed of the motor to obtain the torque command Tcmd1. Next, in order not only to protect the components, such as transistors for controlling the motor but also to protect the motor itself, the torque command Tcmd1 is inputted into a current limiter 2, in which plus-and-minus upper limit values of the torque command Tcmd1 are clamped at predetermined limit values so as to generate a torque command (an amplitude of the current command in the current loop processing) Tcmd2 to be supplied to each phase current loop circuit which controls the current flowing through each phase winding. In a case where the speed loop control is not carried out, the torque command will be directly inputted to the current limiter 2. Then, the torque command (amplitude of the current command) Tcmd2, output by the current limiter 2, is corrected by a rotor position θ of the motor detected by the detector and a phase advance amount ph to be determined based on the rotational speed of the motor, and then multiplied by sine values having a 2 π/3 phase difference therebetween (3R, 3S, 3T), thereby obtaining torque commands (current commands) Tcmd(R), Tcmd(S) and Tcmd(T) to be supplied to the windings R, S and T, respectively.

Tcmd(R)=Tcmd2·sin(θ+ph)

Tcmd(S)=Tcmd2·sin}θ+(2π/3)+ph}

Tcmd(T)=Tcmd2·sin}θ−(2π/3)+ph}

In each phase current loop, the IP (integral-and-proportional) control or the PI (proportional-and-integral) control is carried out to control the current flowing through each phase winding.

FIG. 2 is a block diagram showing a conventional control system whose current loop comprises the IP control, corresponding to the R phase of the motor. Control systems for the other phases are substantially the same as that disclosed in FIG. 2. In the drawing, a reference numeral 4 represents an integral element with an integral gain k1, and a reference numeral 5 represents a proportional element with a proportional gain K2. Furthermore, a reference numeral 6 represents a transfer function term of the R-phase winding of the motor, with a winding inductance L and a winding resistance R. A reference character E represents a reverse electromotive force generated by the motor.

A current deviation, obtained by subtracting the actual current Ir from the torque command Tcmd(R), is integrated in the element 4, the integrated value is multiplied by the integral gain K1 and, from this product, the product of the actual current Ir and proportional constant K2 and the reverse electromotive force E are subtracted respectively. The resulting value is supplied to R-phase winding to cause current Ir to flow through the R-phase winding.

As shown in FIG. 2, the current loop comprise, of the 2nd-order control system. Increase of rotational speed of the motor and the resulting increase of the input frequency of each current loop causes a reduction of gain and a generation of phase lag. The phase lag is compensated by the phase lead control using the phase lead correction amount ph as is described above. However, the gain reduction cannot be compensated, so that current amplitude attenuates with increasing rotational speed, thereby causing a decrease of the maximum torque.

As described above, in a current loop, the phase lag and gain reduction occur in the high-frequency region when the motor runs fast. As described previously, since the phase lag can be predicted from the rotational speed of the motor, the phase lag can be compensated by the phase lead control which advances the phase of the command. However, the gain reduction cannot be compensated. For this reason, the amplitude of the actual current becomes small with respect to the command. Therefore, in some cases, the command may be limited even if the amplitude of the actual current is smaller than the limit value of the current limiter.

On the other hand, during deceleration, the motor generates a reverse electromotive force in the same direction as that in which the voltage of the motor is applied, so that sometimes the magnitude of the reverse electromotive force may exceed the limit value of the current limiter. During deceleration, the direction of the current flowing to the motor is opposite to the rotational direction of the motor, but is the same as the direction of the reverse electromotive force. Hence, when the reverse electromotive force is added to the command, the maximum value of the actual current may sometimes exceed the limit value, possibly damaging the control elements, such as transistors, and the motor itself.

DISCLOSURE OF INVENTION

An object of the present invention is to provide a control method for increasing the maximum torque when the motor is accelerating, as well as for preventing the maximum current from exceeding a limit value when the motor is decelerating.

In order to accomplish the above purpose, the present invention obtains an amplitude of actual current of each phase by measuring the actual current, corrects a current limit value based on a ratio of the current command of the current loop to the amplitude of the actual current in such a manner that the actual current becomes a proper clamp value, and clamps the torque command by the corrected current limit value to provide an amplitude of the current command to be supplied to the current loop.

Furthermore, the present invention provides a control method for an alternating current motor with a current limiter, wherein a torque command is inputted to the current limiter to clamp the torque command at a limit value given by the current limiter when the torque command exceeds the limit value. The torque command having passed through the current limiter determines an amplitude of a current command for the current loop processing of each phase in controlling the current flowing through a winding of each phase of the motor, thereby providing sine-wave current commands, as torque commands supplied to the windings of respective phases, on the bases of the determined amplitude of the current command, the number of phases, a rotational position of the rotor of the motor detected by a position detector, and a phase lead amount to be compensated by the phase lead control, the control method comprising the steps of: measuring an amplitude of actual current flowing through a motor winding and then calculating a ratio of the torque command stored in the preceding period, which serves as an input to the current loop, to thus measure the amplitude of the actual current; correcting the limit value pre-set in the current limiter based on the calculated ratio, thereby obtaining an actual limit value of the current limiter to be applied in the present period; outputting the torque command to the current loop after allowing the torque command to pass through the current limiter and storing the corrected limit value; whereby the amplitude of the actual current flowing through the winding of each phase of the motor is substantially suppressed so as not to exceed the limit value pre-set in the current limiter.

Preferably, the correcting step for correcting the limit value of the current limiter is executed during the decelerating period of the motor and during the accelerating period of the motor in which the torque command is larger than the limit value set by the limiter.

Furthermore, it will be preferable that the torque command to be inputted to the current limiter is a torque command obtained by executing the proportional-and-integral control of a deviation between a command speed and an actual speed obtained by a speed detector.

As described above, according to the present invention, the limit value is dependent on the ratio of the current command of the current loop to the amplitude of the actual current. Therefore, the limit value for restricting the upper limit of the torque command increases to enlarge the amplitude of the current command in such a case where the output torque decreases as the amplitude of the actual current decreases during the rotation at high speeds, thereby maintaining the amplitude of the actual current at the predetermined limit value without reducing the amplitude of the actual current and preventing the output torque from decreasing. Furthermore, during deceleration, even when the direction of the command and the rotational direction of the motor are reversed to cause the magnitude of the actual current to exceed the predetermined limit value, the amplitude of the actual current is enlarged to cause the ratio of the current command to the amplitude of the actual current to decrease, so that the value of the command is decreased to control the amplitude of the actual current to be a proper limit value.

BRIEF DESCRIPTION OF DRAWINGS

FIGS. 5(a) and 5(b) are is the experimental data showing the relations between the rotational speed and the maximum output torque, one for the conventional control method and the other for the control method of the present invention; and FIGS. 6(a) and 6(b) are is the experimental data showing the conditions of the actual current during deceleration, one for the conventional control method and the other for the control method of the present invention.

BEST MODE FOR CARRYING OUT THE INVENTION

One embodiment of the present invention will be described hereinafter, taking an example from the control of a three-phase AC motor.

The current flowing through each of the R-, S- and T-phase windings of the three-phase AC motor is expressed, when $I_0$ represents an amplitude, as follows:

$Ir = I_0 \sin \theta$ $Is = I_0 \sin \{\theta + (2\pi/3)\}$ $It = I_0 \sin \{\theta - (2\pi/3)\}$ When $I_2 = Ir^2 + Is^2 + It^2$, we obtain $$I_2 = I_0^2[\sin^2\theta + \sin^2\{\theta+(2\pi/3)\} + \sin^2\{\theta-(2\pi/3)\}] = (3/2)I_0^2 \quad (1)$$

From the above equation 1, the amplitude $I_0$ of the actual current has no relation with the rotational angle $\theta$ of the rotor and is determined by the following equation.

$$= [(2/3) \cdot I_2]^{1/2} \quad (2)$$

Figure 1:
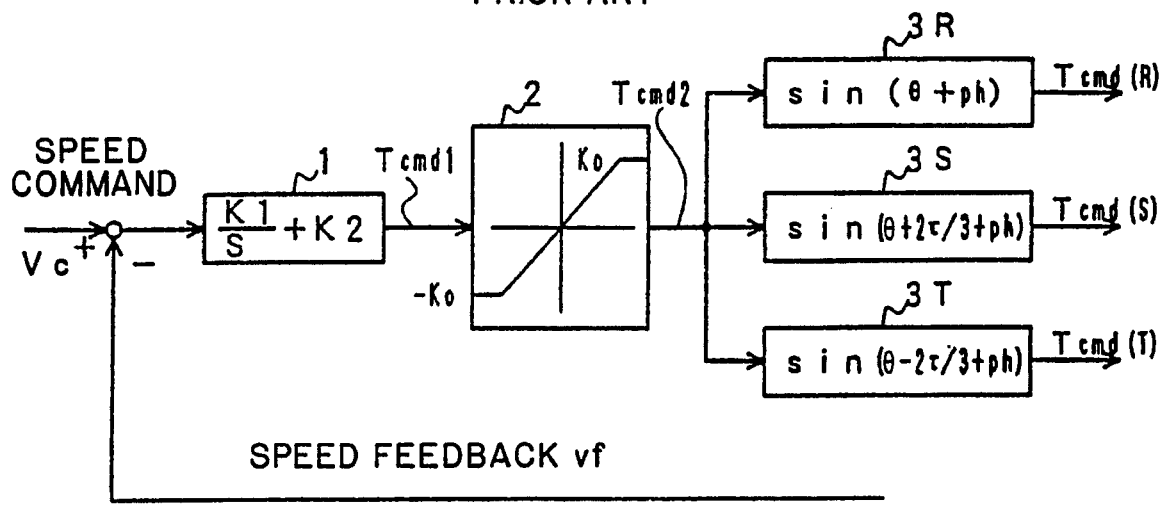
FIG. 1 is a block diagram showing an essential part of a control system of a three-phase AC motor for executing the speed control.
Figure 2:
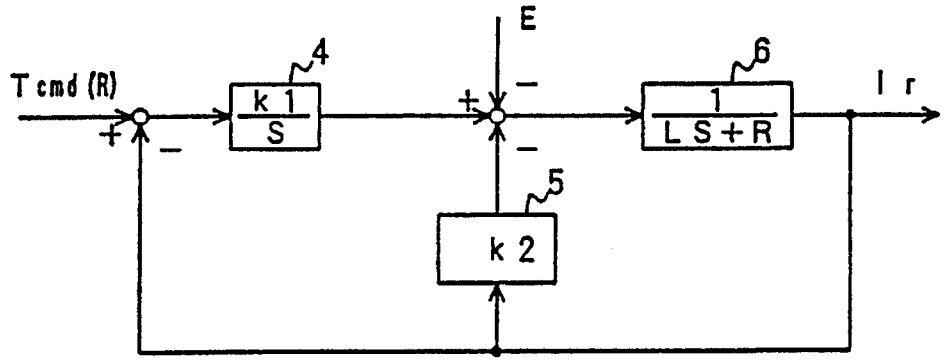
FIG. 2 is a block diagram showing a current control system of the AC motor of FIG. 1.

Assuming, when the amplitude of the actual current is $I_0$, that the magnitude of the torque command Tcmd2 (the amplitude of the current command of the current loop) serving as an input of the current loop is $T_0$, the gain of the current loop is expressed by $I_0/T_0$. If a current limit value of the motor (a limit value of the current limiter shown in FIG. 1) is $K_0$, the magnitude of the current command Tcmd2 is necessary to be $K_0 \cdot T_0/I_0$ to equalize the amplitude of the actual current with $K_0$. That is, based on the magnitude $T_0$ of the torque command Tcmd2 and the amplitude $I_0$ of the actual current, if the limit value L of the current limiter is always varied as $$L = K_0 \cdot T_0 / I_0 \quad (3)$$

the amplitude of the actual current does not reduce even in a high-speed region, and it becomes possible to prevent the torque reduction.

Detecting the actual currents Ir, Is and It of respective phases and executing the calculation of the equation 1, the magnitude $I_0$ of the actual current is obtained. Obtaining the current limit value L at which the magnitude of the actual current becomes the limit value $K_0$ on the bases of the magnitude $I_0$ and the torque command Tcmd2, and if the torque command Tcmd1 is clamped at this limit value L, the amplitude of the actual current will not reduce even in the high-speed region and approximates to the predetermined current limit $K_0$. Therefore, no torque reduction occurs (if the amplitude $I_0$ of the actual current decreases as rotational speed increases, the limit value L increases and the torque command Tcmd2 increases, so that the amplitude of the actual current increases and approximates to the limit value $K_0$). Furthermore, in deceleration, even if the actual current becomes larger than the current limit value, the limit value of the current command (the limit value of the current limiter 2) decreases (since L reduces with increasing $I_0$). Thus, the actual current can be suppressed within the limit.

Figure 3:
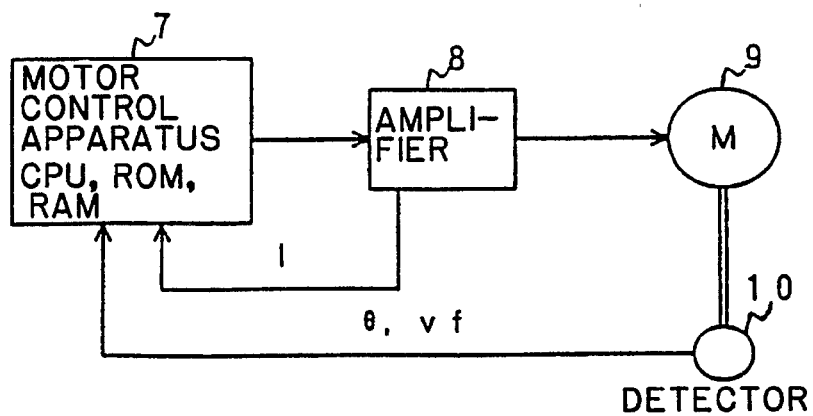
FIG. 3 is a block diagram showing one embodiment of an AC motor control system embodying the control method of the present invention.

FIG. 3 is a block diagram showing a control system of an AC motor (of three-phase type) embodying one embodiment of the present invention. A reference numeral 7 represents a motor control apparatus comprising a processor (CPU), a ROM, a RAM, etc.; a reference numeral 8 is an amplifier; a reference numeral 9 is a motor; and a reference numeral 10 is a detector for detecting the speed of the motor and the rotor position. The processor of the motor control apparatus 7 executes the previously-described speed loop processing based on the command speed and a motor speed feedback value detected by the detector 10 to obtain the torque command (the amplitude of the current command) Tcmd1, the processing of the current limiter obtains the torque command Tcmd2, which will be described later, and obtains the torque commands (the current commands) Tcmd(R), Tcmd(S) and Tcmd(T) of respective phases R, S and T based on the rotor position. θ, which is detected by the detector 10, and the phase lead amount ph, which is determined by the actual speed of the motor. Then, the previously-described current loop processing is executed based on the respective torque commands and actual currents It, Is and It of respective phases, which are detected by a current detector (not shown in the drawings), to obtain respective phase driving currents for the drive and control of the motor.

The control system of the above-described three-phase AC motor has the same construction and operation as the conventional control system, except for the limit processing of the current command by the current limiter.

Figure 4:
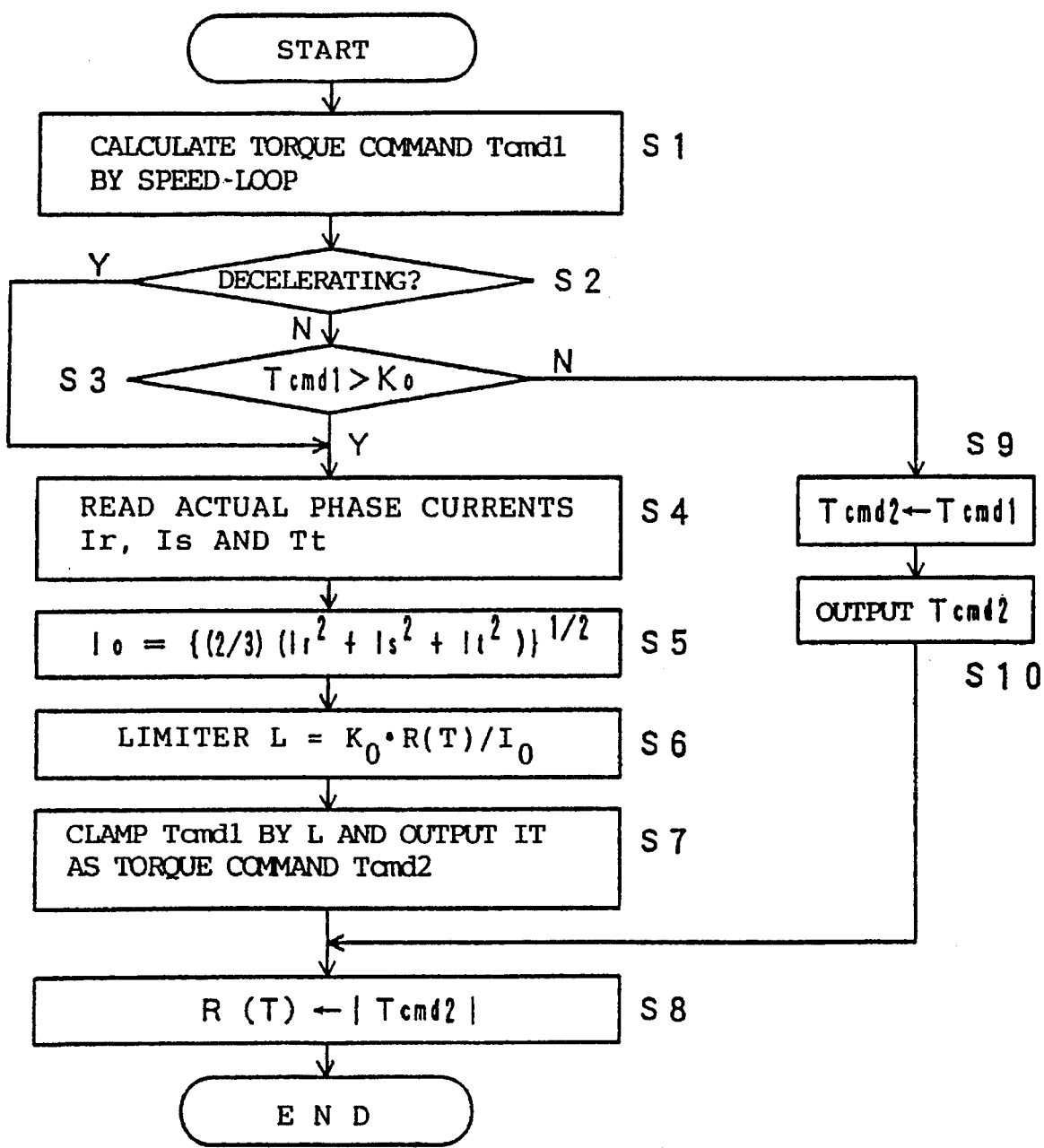
FIG. 4 is a flowchart showing the processing executed by a processor of the above embodiment.

FIG. 4 is a flowchart showing the current limit processing in the motor control, executed by the processor of the motor control apparatus 7.

The processor of the motor control apparatus 7 executes the processing shown in FIG. 4 in predetermined cycles. First, the processor executes the speed loop processing based on the command speed Vc given beforehand and the speed feedback vf detected by the detector 10 to obtain the torque command Tcmd1 in the same manner as the conventional system (Step S1). Next, the processor makes a judgment as to whether the motor is decelerating (Step S2). If the motor is not decelerating, the processor further makes a judgement as to whether the torque command Tcmd1 obtained in the step S1 is larger than the predetermined current limit value $K_0$ (Step S3). As the torque command value Tcmd1 is smaller than the current limit value $K_0$ in the beginning of motor drive, the torque command value Tcmd1 is not limited and outputted as the torque command Tcmd2 to the current loop (Steps S9 and S10). Then, the absolute value of the output torque command value (the amplitude of the current command) Tcmd2 is stored in the register R(T) to finish the current limit processing of this cycle.

On the other hand, if the torque command value Tcmd1 exceeds the current limit value $K_0$ in the step S3, the processor reads the actual currents It, Is and It of respective phases detected by the current detector (not shown in the drawings), and executes the calculation by the above equation 2 to obtain the amplitude $I_0$ of the actual current (Steps S4 and S5). Subsequently, the magnitude of the torque command Tcmd2 (the amplitude of the torque command of each phase), obtained in the preceding cycle and stored in the register R(T), is multiplied by the predetermined current limit value $K_0$. The result is divided by the amplitude $I_0$ of the actual current obtained in the step S5 to obtain the current limit value L. That is, the following calculation, identical with the above equation 3, is executed to obtain the current limit value (Step S6).

$$L=K_0 \cdot R(T)/I_0=K_0 \cdot T_0/I_0$$

Next, the torque command value Tcmd1 obtained in the step S1 is clamped by the current limit value L obtained in the step S6 and is outputted as the torque command Tcmd2 to the current loop (Step S7). Then, the magnitude of the output torque command Tcmd2 is stored in the register R(T) (Step S8) to terminate the current limit processing. Upon output of the torque command value Tcmd2, the torque commands of respective phases are calculated, on the bases of the rotor position θ and the phase lead amount ph corresponding to the rotational speed of the motor, to execute the current loop processing in the same manner as the conventional system.

As described above, when the torque command value exceeds the specific current limit value $K_0$, the current limit value L is varied momently (at each predetermined period or cycle based on the ratio between the magnitude of the torque command Tcmd2 (magnitude to be stored in the register R(T)), which is the amplitude of the current commands (torque commands) Tcmd(R), Tcmd(S) and Tcmd(T) in the respective current loop processing, and the amplitude $I_0$ of the actual current so that the amplitude of the actual current is controlled to be identical with the specific current limit value $K_0$. On the other hand, if the motor starts decelerating, the processing of the steps S2 and S4–S8 will be executed. In this case, if the amplitude of the actual current increases due to the reverse electromotive force of the motor, the current limit value L to be obtained in the step S6 decreases. Therefore, the torque command value Tcmd2, i.e., the amplitude of the current command to each current loop, is reduced, thereby preventing the actual current from exceeding the limit value.

In the above embodiment, when the motor is not decelerating and the torque command Tcmd1 obtained in the speed loop processing does not exceed the predetermined limit value $K_0$, the processor executes the processings of steps S9 and S10 to prevent the limit value L from varying. However, the limit value L may be set variable too. In such a case, as the processings of the steps S2, S3, S9 and S10 are no longer necessary, the processor proceeds to the step S4 from the step S1. When the amplitude of the actual current obtained in the step S5 is "0", that is, when the motor is not driven, the processor outputs the torque command Tcmd1 obtained in the step S1 as the torque command Tcmd2 and then proceeds to the step S8. When the amplitude $I_0$ is not "0", the processor will execute the processing of the steps S6 to S8.

FIGS. 5(a) and 5(b) show experimental results concerning the relations between the maximum torque under acceleration and the rotational speed of the motor, one for the conventional control method, in which the current limit value is fixed, and the other for the control method of the present invention, in which the current limit value is variable. An ordinate represents the torque (kgfcm), and an abscissa represents the rotational speed (rpm) of the motor. FIG. 5(a) shows the experimental result by the conventional method, and FIG. 5(b) shows the experimental result by the method of present invention. As seen from the comparison of these experimental results, the method of present invention is superior to the conventional method in that no torque reduction occurs even when the motor rotates at high speeds.

FIGS. 6(a) and 6(b) show experimental results concerning the actual current measured when the rotational speed is decelerated from 3,000 rpm to 0 rpm, the first one for the conventional method and the second one for the method of the present invention FIG. 6(a) shows the experimental result of the method of the conventional method, and FIG. 6(b) shows the experimental result of the present invention. The current limit value $K_0$ is 100 A. Disagreement between the current limit value $K_0$ and the torque command value Tcmd2 during the deceleration by the conventional method shown in FIG. 6(a) is due to the difference of scale. As seen from FIG. 6(a), the actual current exceeds the current limit value $K_0$ in the case of the conventional method, while the actual current does not exceed the current limit value $K_0$ in the case of the method of the present invention.

According to the method of the present invention, the limit value for limiting the current command (the torque command) is varied momently (at each predetermined cycle), based on the ratio of the current command (torque command) to the amplitude of the actual current, so that the amplitude of the actual current becomes equal to the predetermined limit value. Therefore, in the case where the amplitude of the actual current decreases due to reduction of the current loop gain at higher speeds, the limit value of the current command (the torque command) increases. Accordingly, the current command (the torque command) increases and the amplitude of the actual current is enlarged. Consequently, it becomes possible to prevent the output torque from being reduced even at high speeds, thereby enabling the maximum torque to be increased even at high speeds.

Moreover, in the case where the actual current is increased due to the reverse electromotive force during deceleration, the limit value of the current command (the torque command) decreases. Thus, the current command (the torque command) decreases, and, as a result, the amplitude of the actual current is reduced, so that it will not exceed the predetermined current limit value. Thus, the transistors of the control system and the motor itself can be protected from being damaged by excessive current.

What is claimed is:

1. A control method for an alternating current motor having phase windings and with a current limiter designed for clamping a torque command at a limit value when the torque command exceeds the limit value so that the torque command which has been processed by the current limiter is provided as an amplitude of a current command to current loops of respective phase windings, said control method comprising the steps of:

obtaining an amplitude of total actual current by measuring the actual current of each phase winding;

correcting the limit value of current based on a ratio of said current command of the current loops to said amplitude of the total actual current; and clamping said torque command at said limit value of current corrected in correcting step, so as to provide the amplitude of the current command to be supplied to the current loops.

2. A control method for an alternating current motor in accordance with claim 1, further comprising executing said correcting step for correcting the limit value of current during a decelerating period of the motor and during an accelerating period of the motor in which said torque command is larger than the limit value set by the current limiter.

3. A control method for an alternating current motor in accordance with claim 2, further comprising the step of summing squares of the actual currents flowing through each of the windings of the motor to determine the amplitude of the actual current flowing through the respective one of the windings.

4. A control method for an alternating current motor in accordance with claim 1, further comprising the step of summing squares of the actual currents flowing through each of the windings of the motor to determine the amplitude of the actual current flowing through the respective one of the windings.

5. A control method for an alternating current motor in accordance with claim 1, further comprising the step of summing squares of the actual currents flowing through each of the windings of the motor to determine the amplitude of the actual current flowing through the respective one of the windings.

6. A control method for an alternating current motor having a rotor, windings of different, respective phases, and predetermined periods and with a current limiter, wherein a torque command is inputted to the current limiter to clamp the torque command at a current limit value given by the current limiter when the torque command exceeds the current limit value; the torque command, having passed through the current limiter, determining an amplitude of a current command for current loop processing of each phase winding in controlling actual currents flowing through the windings of the respective phases of the motor, thereby providing sine-wave current commands, as torque commands to be supplied to the windings of the respective phases, based upon the amplitude of the current command, a total number of the phases, a rotational position of the rotor of the motor detected by a position detector, and a phase lead amount to be compensated by phase lead control, said control method comprising the steps of:

measuring amplitudes of the actual currents flowing through respective ones of the winding in each of the predetermined periods and then calculating a ratio based upon the torque command stored in a preceding one of the predetermined periods, which serves as an input to the current loop, and the amplitudes of the actual currents flowing through the windings;

correcting a preset limit value in said current limiter based on the calculated ratio, thereby obtaining the current limit value of the current limiter to be applied in a present one of the predetermined periods; and outputting said torque command to the current loop after allowing said torque command to pass through the current limiter storing the current limit value;

whereby the amplitude of the actual current flowing through the winding of each phase of the motor is substantially suppressed so as not to exceed the preset limit value set in the current limiter.

7. A control method for an alternating current motor in accordance with claim 6, further comprising executing said correcting step for correcting the preset limit value of the current limiter during a decelerating period of the motor and during an accelerating period of the motor in which said torque command is larger than the preset limit value set in the current limiter.

8. A control method for an alternating current motor in accordance with claim 7, wherein the torque command inputted to the current limiter is a torque command obtained through a proportional-and-integral control of a deviation between a command speed for the motor and an actual speed of the motor obtained by a speed detector.

9. A control method for an alternating current motor in accordance with claim 7, further comprising determining the current limit value L of the current limiter to be passed in the present one of the predetermined periods by the following equation:

$$L=K_0 \cdot T_0/I_0;$$

wherein $I_0$ represents the amplitude of the actual current flowing through the respective one of the windings in the present one of the predetermined periods; $T_0$, the torque command supplied to the current loop and stored in the preceding one of the predetermined periods; and $K_0$, the preset limit value set in the current limiter.

10. A control method for an alternating current motor in accordance with claim 7, further comprising the step of summing squares of the actual currents flowing through each of the windings of the motor to determine the amplitude of the actual current flowing through the respective one of the windings.

11. A control method for an alternating current motor in accordance with claim 6, wherein the torque command inputted to the current limiter is a torque command obtained through a proportional-and-integral control of a deviation between a command speed for the motor and an actual speed of the motor obtained by a speed detector.

12. A control method for an alternating current motor in accordance with claim 11, further comprising determining the current limit value L of the current limiter to be passed in the present one of the predetermined periods by the following equation:

$$L=K_0 \cdot T_0/I_0;$$

wherein $I_0$ represents the amplitude of the actual current flowing through the respective one of the windings in the present one of the predetermined periods; $T_0$, the torque command supplied to the current loop and stored in the preceding one of the predetermined periods; and $K_0$, the preset limit value set in the current limiter.

13. A control method for an alternating current motor in accordance with claim 11, further comprising the step of summing squares of the actual currents flowing through each of the windings of the motor to determine the amplitude of the actual current flowing through the respective one of the windings.

14. A control method for an alternating current motor in accordance with claim 6, further comprising determining the current limit value L of the current limiter to be passed in the present one of the predetermined periods by the following equation:

$$L=K_0 \cdot T_0/I_0;$$

wherein $I_0$ represents the amplitude of the actual current flowing through the respective one of the windings in the present one of the predetermined periods; $T_0$, the torque command supplied to the current loop and stored in the preceding one of the predetermined periods; and $K_0$, the preset limit value set in the current limiter.

15. A control method for an alternating current motor in accordance with claim 6, further comprising determining the current limit value L of the current limiter to be passed in the present one of the predetermined periods by the following equation:

$$L=K_0 \cdot T_0/I_0;$$

wherein $I_0$ represents the amplitude of the actual current flowing through the respective one of the windings in the present one of the predetermined periods; $T_0$, the torque command supplied to the current loop and stored in the preceding one of the predetermined periods; and $K_0$, the preset limit value set in the current limiter.

16. A control method for an alternating current motor in accordance with claim 6, further comprising the step of summing squares of the actual currents flowing through each of the windings of the motor to determine the amplitude of the actual current flowing through the respective one of the windings.

* * * * *

UNITED STATES PATENT AND TRADEMARK OFFICE
CERTIFICATE OF CORRECTION

PATENT NO. : 5,467,001
DATED : November 14, 1995
INVENTOR(S) : Yasusuke IWASHITA It is certified that error appears in the above-indentified patent and that said Letters Patent is hereby corrected as shown below:

Column 1, line 11, delete "thus";

line 17, delete "," and after "motors" insert --,--;

line 32, change "of" to --vf--;

line 64, change "}" (first occurrence) to --{--; and line 65, change "}" (first occurrence) to --{--.

Column 2, line 10, change "K2" to --k2--; and line 23, change "comprise, of" to --comprises--.

UNITED STATES PATENT AND TRADEMARK OFFICE
CERTIFICATE OF CORRECTION

PATENT NO. : 5,467,001
DATED     : November 14, 1995
INVENTOR(S): Yasusuke Iwashita It is certified that error appears in the above-indentified patent and that said Letters Patent is hereby corrected as shown below:

Column 4, line 10, delete "is the" and
          line 14, delete "is the".

Column 6, line 26, after "cycle" inset --)--.

Signed and Sealed this

Sixteenth Day of April, 1996

BRUCE LEHMAN

Attest:

Attesting Officer

Commissioner of Patents and Trademarks